(12) United States Patent
Gunsaullus

(10) Patent No.: US 9,932,770 B1
(45) Date of Patent: Apr. 3, 2018

(54) PODIUM LADDER ADAPTER

(71) Applicant: Scott E. Gunsaullus, Long Grove, IL (US)

(72) Inventor: Scott E. Gunsaullus, Long Grove, IL (US)

( * ) Notice: Subject to any disclaimer, the term of this patent is extended or adjusted under 35 U.S.C. 154(b) by 0 days.

(21) Appl. No.: 15/615,373

(22) Filed: Jun. 6, 2017

(51) Int. Cl.
| | |
|---|---|
| E06C 7/14 | (2006.01) |
| B62B 3/04 | (2006.01) |
| B62B 3/00 | (2006.01) |
| E06C 1/14 | (2006.01) |

(52) U.S. Cl.
CPC ............. *E06C 7/14* (2013.01); *B62B 3/002* (2013.01); *B62B 3/04* (2013.01); *E06C 1/14* (2013.01)

(58) Field of Classification Search
CPC ... E06C 7/14; E06C 1/14; B62B 3/002; B62B 3/04
USPC ................... 248/210, 238; 182/194, 116, 45; 211/118
See application file for complete search history.

(56) References Cited

U.S. PATENT DOCUMENTS

| | | | | |
|---|---|---|---|---|
| 4,450,935 | A * | 5/1984 | Gustavus | E04G 3/26 182/45 |
| 7,036,629 | B2 * | 5/2006 | Nicolaysen | E04G 3/265 182/45 |
| 8,123,000 | B2 * | 2/2012 | Whitaker | E06C 7/143 182/129 |
| 8,353,490 | B2 * | 1/2013 | Spinelli | F16M 13/02 211/118 |
| D683,054 | S * | 5/2013 | Deardorf | D25/68 |
| 2009/0050761 | A1 * | 2/2009 | Gunsaullus | E06C 7/14 248/242 |

* cited by examiner

*Primary Examiner* — Todd M Epps
(74) *Attorney, Agent, or Firm* — Mathew R. P. Perrone, Jr.; Joseph J. Whang

(57) ABSTRACT

A podium ladder adapter permits the supporting of tools or materials to be used at a construction site. The podium ladder adapter is especially useful for supporting a cart on a podium ladder, when the cart contains those tools or materials. The podium ladder adapter is used to support a cart used for transporting the required tools and materials around the construction site and support that cart on a podium ladder.

15 Claims, 17 Drawing Sheets

PODIUM LADDER ADAPTER

This invention relates to a podium ladder adapter and more particularly to a podium ladder adapter, which greatly facilitates a use of a podium ladder by permitting tools or material at least near or on a podium ladder.

BACKGROUND OF THE INVENTION

Construction on any building is inherently dangerous for any worker. A type of ladder known as the podium ladder is especially useful on a construction site and other places as well. A very suitable podium ladder is available from the Werner Company of Greenville, Pa.

While a podium ladder has proven useful in the construction industry, it still desirable to make tools and material more readily available to the construction worker, who is using the podium ladder. Not only is the work with such a podium ladder made more efficient, safety on the job and for the worker can be increased. These factors clearly mean increased safety for both the workers and for the observers. Worker safety is improved by reducing material trips up and down the ladder, as well as for other reasons. Observer safety is obtained when less material leaves the work surface as well as for other reasons.

If the podium ladder can cooperate with other tools, materials or implements at the construction site, even more advantages are obtained. For example, if this podium ladder can provide better access to tools or construction materials, whether the ladder includes a tray or not, great advantages are obtained.

Many times, an electrician or plumber is required to use a ladder. If the cart for transporting tools and materials cooperates with the ladder, great advantages are obtained. Not only does the worker become more efficient, safety is promoted. Therefore, a cart, especially a cart suitable for use by an electrician, a carpenter or a plumber, provides many desired results, if that cart will cooperate with the podium ladder.

So improvements in ladder safety and worker safety can positively enhance working conditions for the workers, and others in and around the construction area. It is very desirable to create a device to accomplish these goals.

SUMMARY OF THE INVENTION

Among the many objectives of the present invention is the provision of a podium ladder adapter suitable for facilitating use of a podium ladder by providing access to a cart supporting tools and materials from the podium ladder.

Another objective of the present invention is the provision of a podium ladder adapter suitable for assisting with tools and materials for a worker on a podium ladder.

Yet another objective of the present invention is the provision of a podium ladder adapter suitable for supporting tools or materials on a podium ladder.

Still, another objective of the present invention is the provision of a podium ladder adapter suitable for supporting tools and materials for use from a podium ladder.

Also, an objective of the present invention is the provision of a podium ladder adapter suitable for a podium ladder tools and materials at a construction site, which improves worker efficiency.

A further objective of the present invention is the provision of a podium ladder adapter suitable for supporting tools and materials at a construction site, which improves worker safety.

These and other objectives of the invention (which other objectives become clear by consideration of the specification, claims and drawings as a whole) are met by providing a podium ladder adapter suitable for supporting tools or materials to be used at a construction site. The podium ladder adapter is especially useful for supporting a cart on a podium ladder, when the cart provides tools or materials. The ladder attachment permits a podium ladder adapter to be safely used with a ladder, especially a podium ladder.

BRIEF DESCRIPTION OF DRAWINGS

Throughout the figures of the drawings, where the same part appears in more than one figure of the drawings, the same number is applied thereto.

DESCRIPTION OF THE PREFERRED EMBODIMENTS

Figure 1:
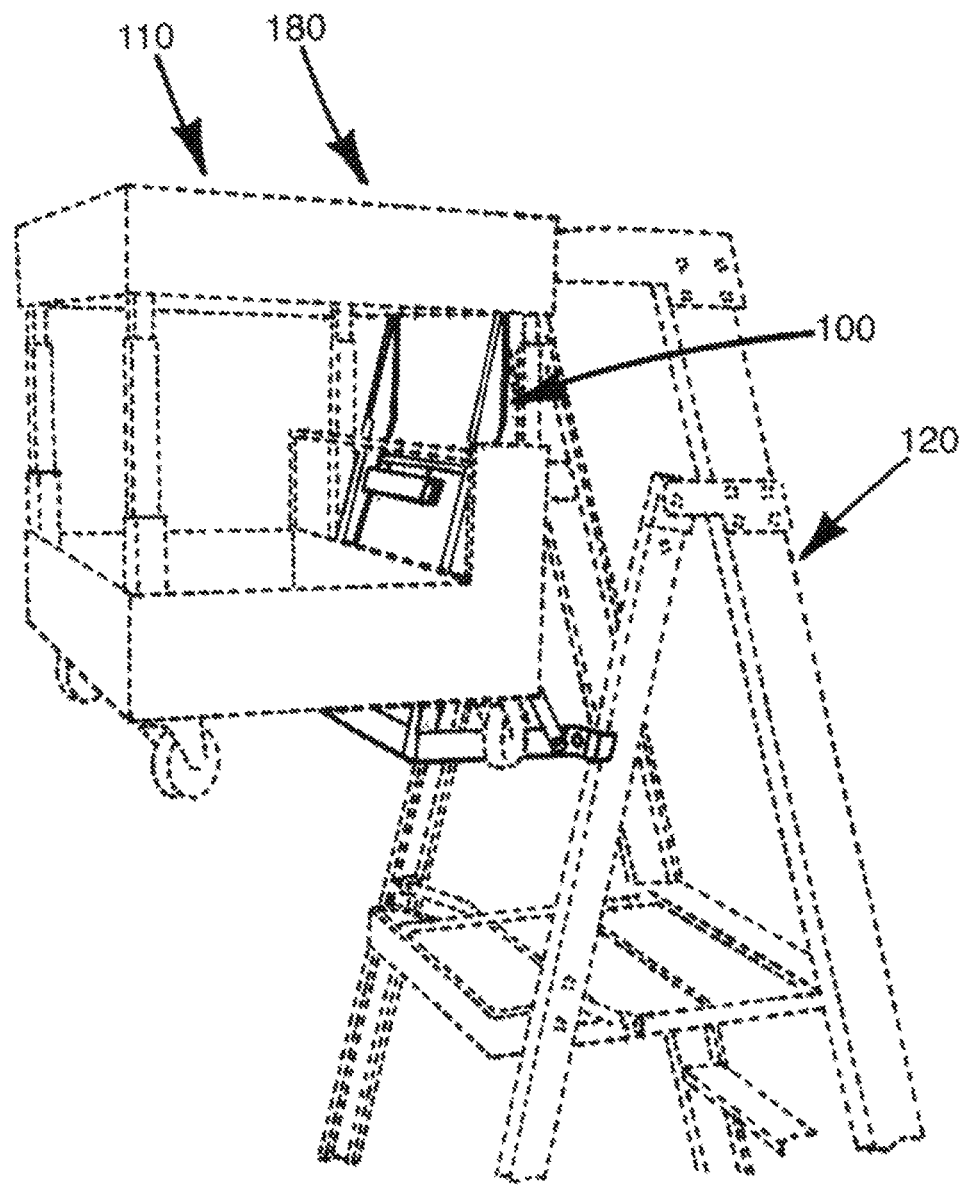
FIG. 1 depicts a front, perspective view of the podium ladder adapter 100 of this invention in use with a tool cart 110 on a podium ladder 120.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

The podium ladder adapter of this invention provides many great advantages, especially in the construction and plumbing industries. An especially successful version of this podium ladder adapter is used to support a cart used for transporting the required tools and materials around the construction site and support that cart on a podium ladder.

Referring now to FIG. 1, the podium ladder adapter 100 is shown in an environment of use, appropriately mounted to a podium ladder 120 and supporting thereon a tool cart 110 in a manner which allows for access of tools or materials in a simple manner to a worker (not shown) elevated on the ladder 120. With this rear perspective view 180 of the podium ladder adapter 100, the functionality thereof is clarified with this further description below.

Figure 2:
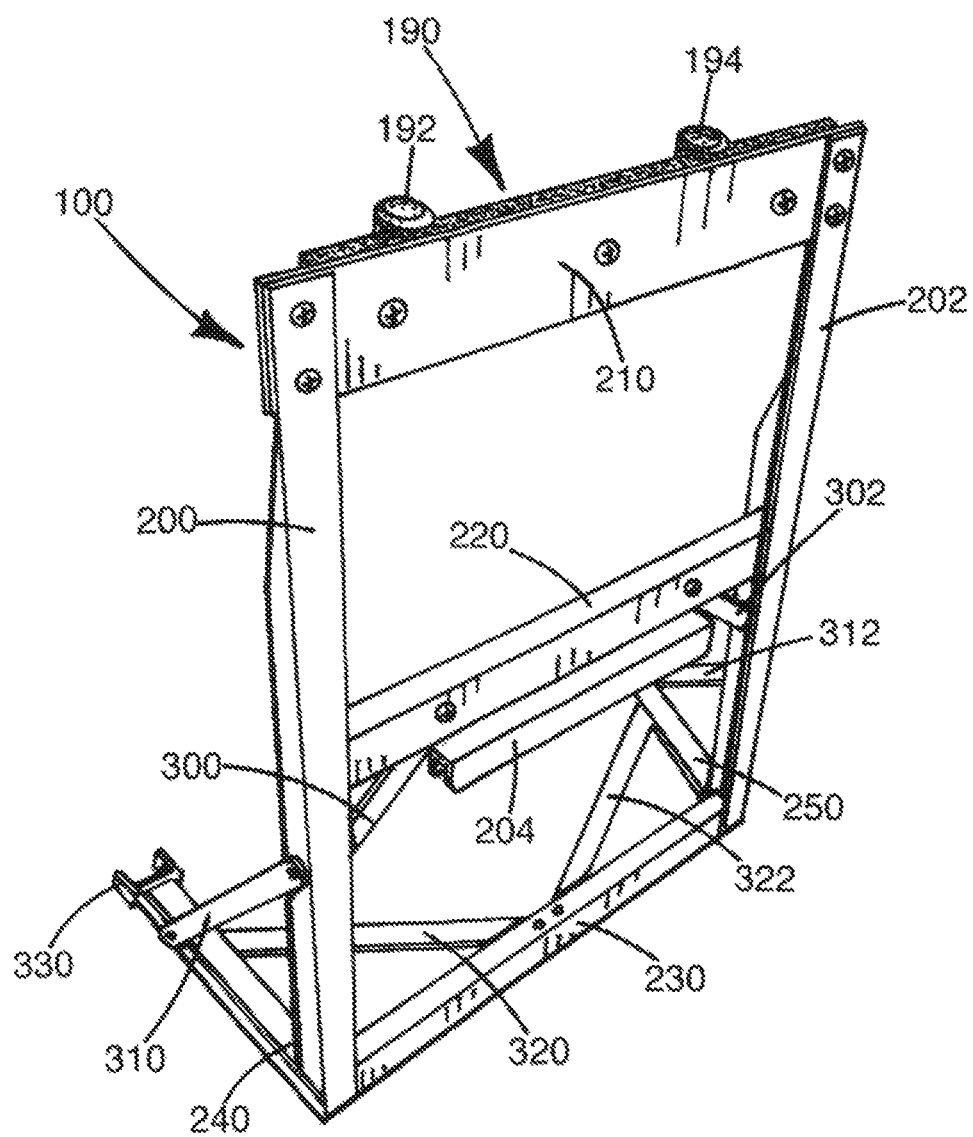
FIG. 2 depicts a rear, perspective view of the podium ladder adapter 100 of this invention.
Figure 3:
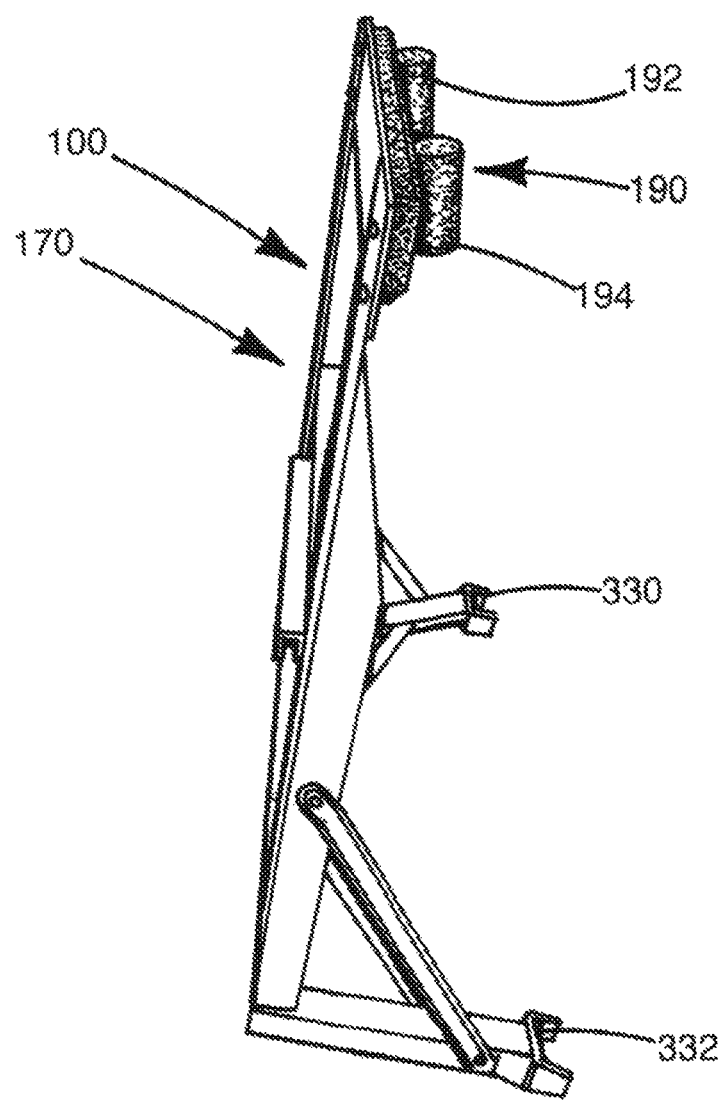
FIG. 3 depicts a side, perspective view of podium ladder adapter 100 of this invention based on FIG. 2.
Figure 4:
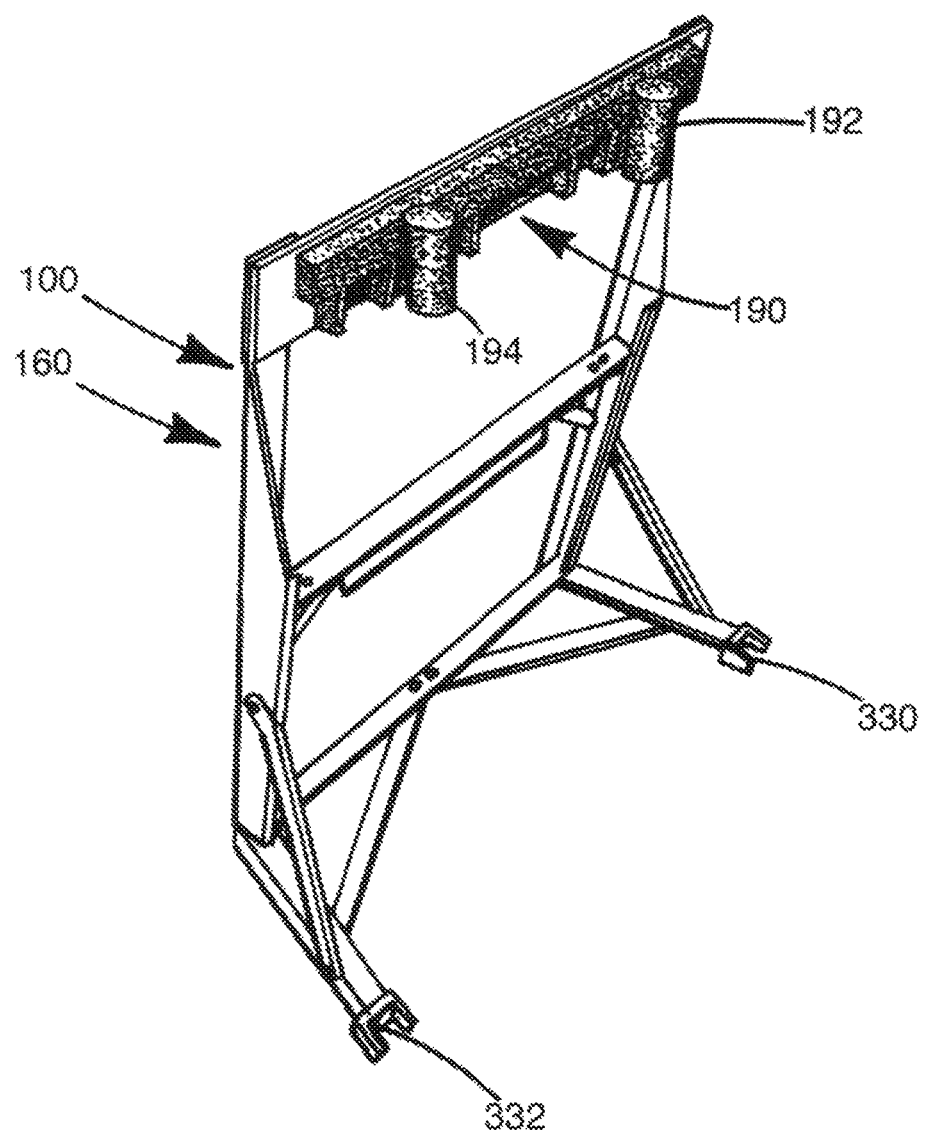
FIG. 4 depicts a front, perspective view of podium ladder adapter 100 of this invention as a reverse view of FIG. 2.
Figure 5:
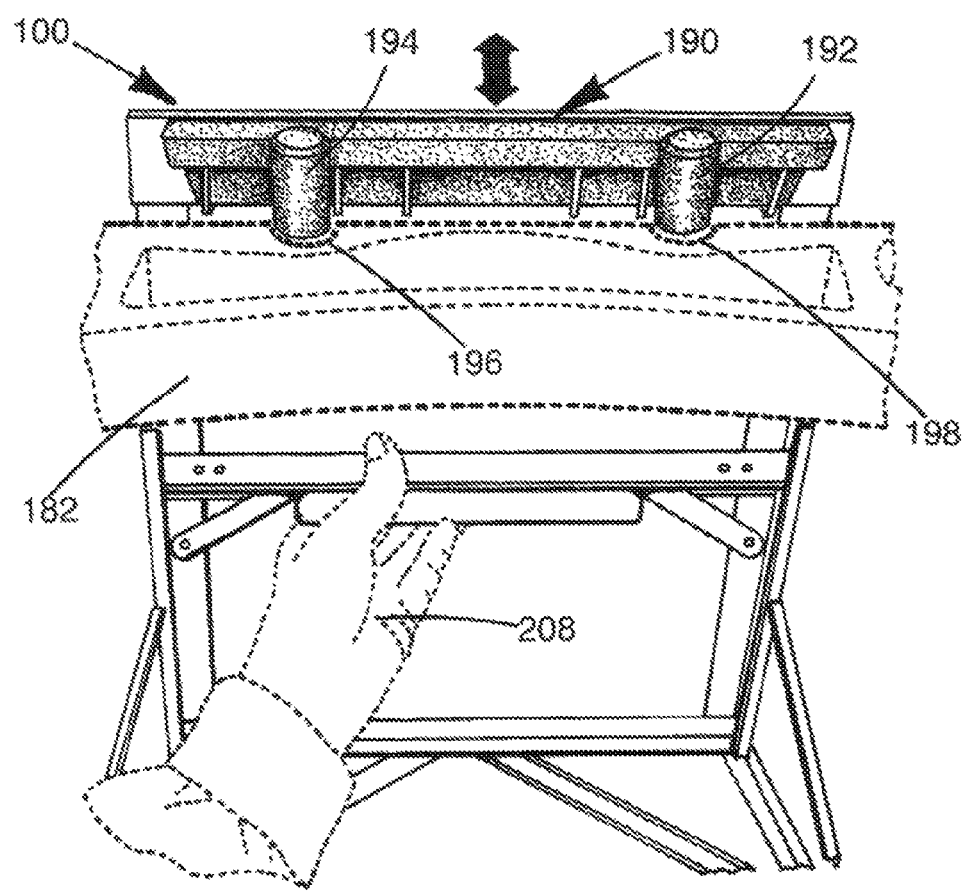
FIG. 5 depicts a perspective view of podium ladder adapter 100 of this invention in the process of being attached to podium ladder 120.
Figure 6:
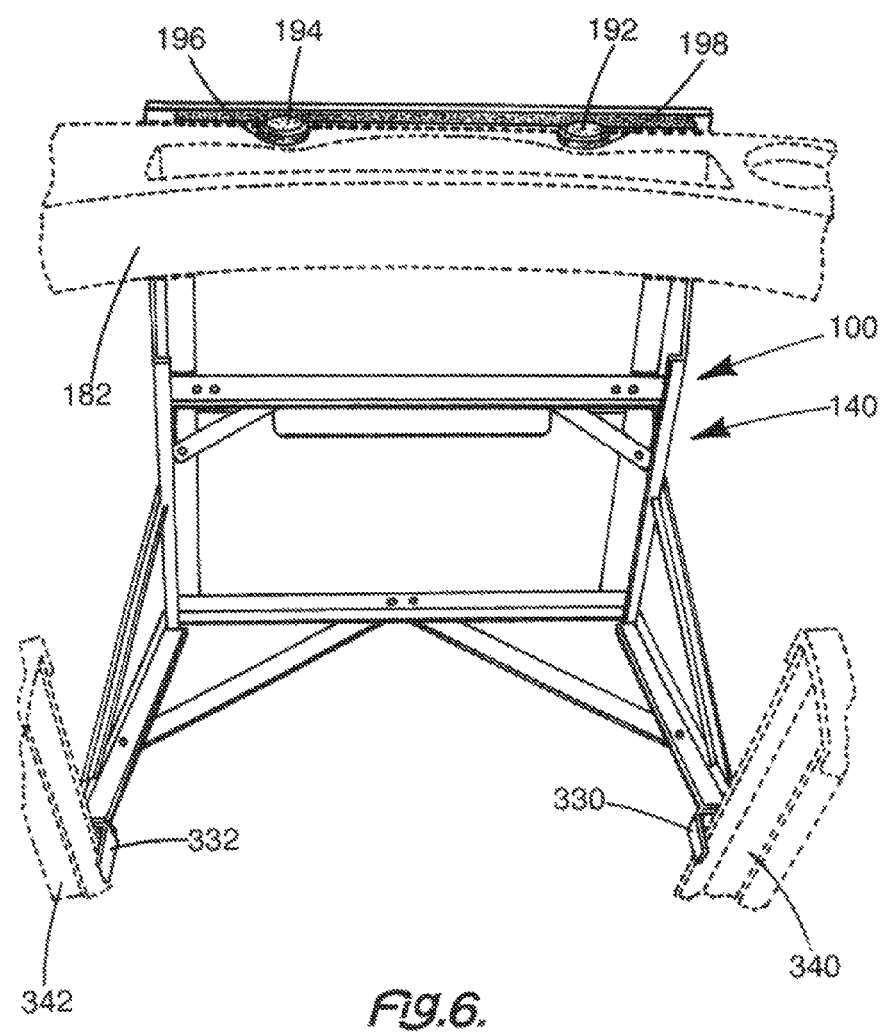
FIG. 6 depicts a perspective view of podium ladder adapter 100 of this invention being attached to podium ladder 120.
Figure 7:
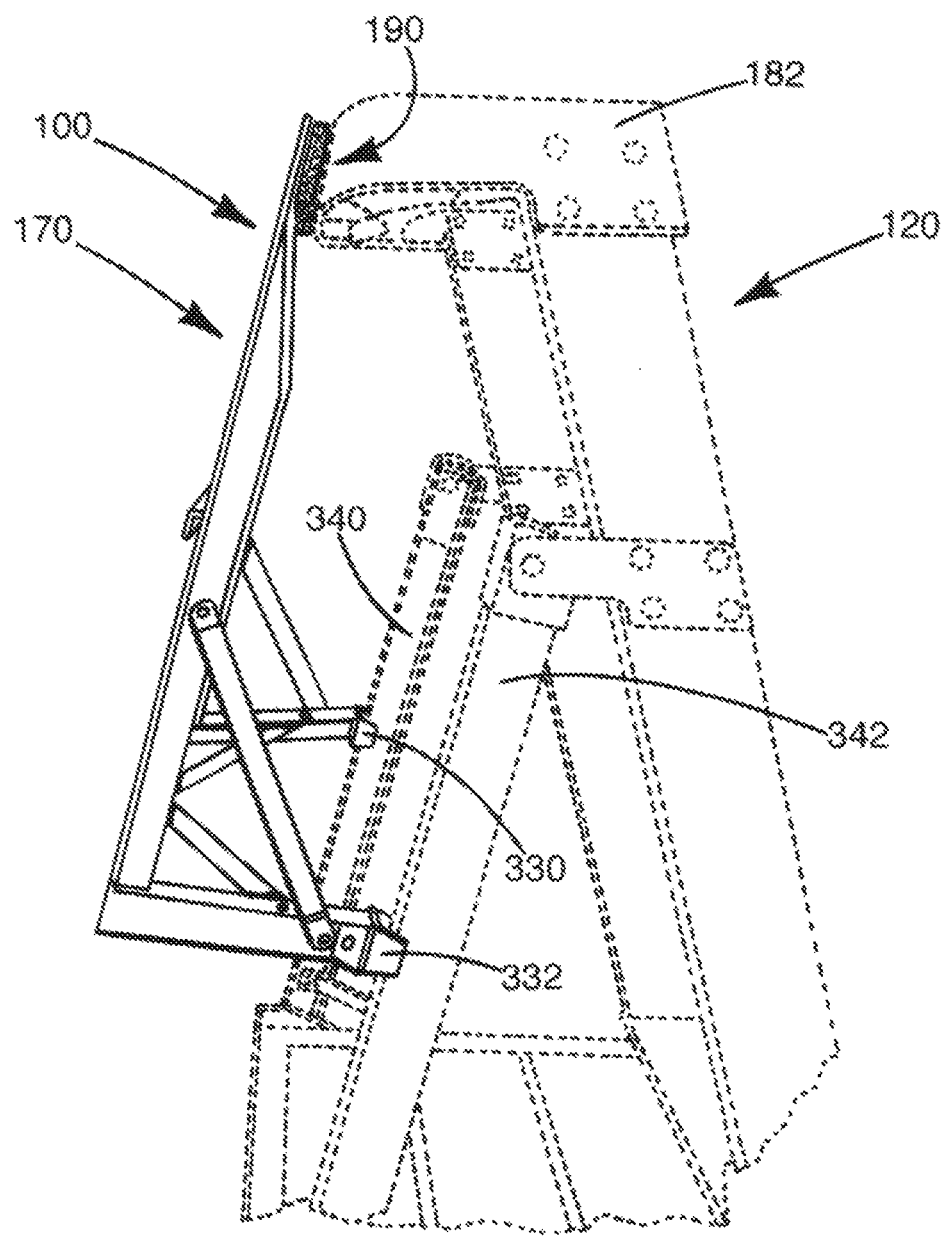
FIG. 7 depicts a side, perspective view of podium ladder adapter 100 of this invention attached to podium ladder 120.
Figure 8:
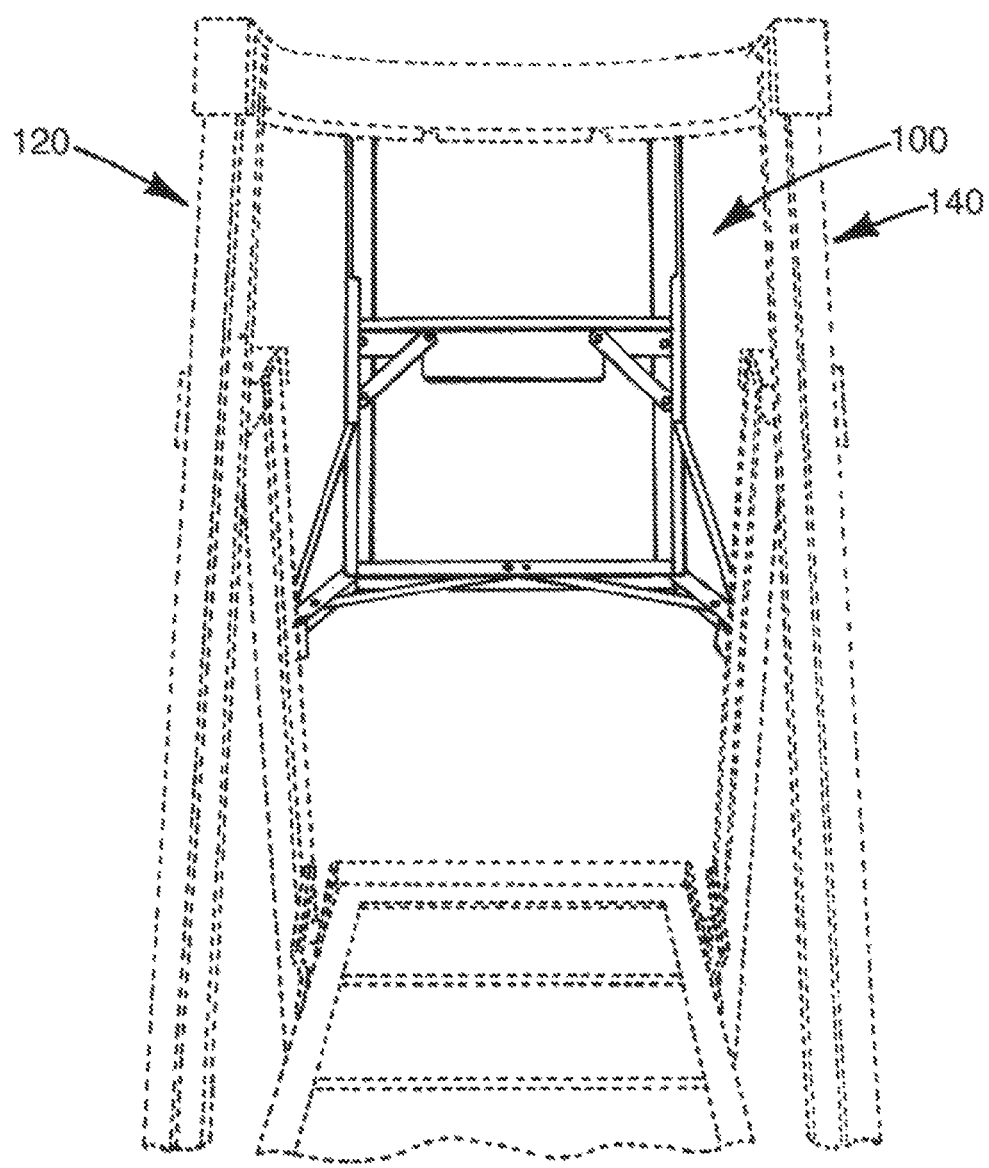
FIG. 8 depicts a front, perspective view of podium ladder adapter 100 of this invention attached to podium ladder 120.
Figure 9:
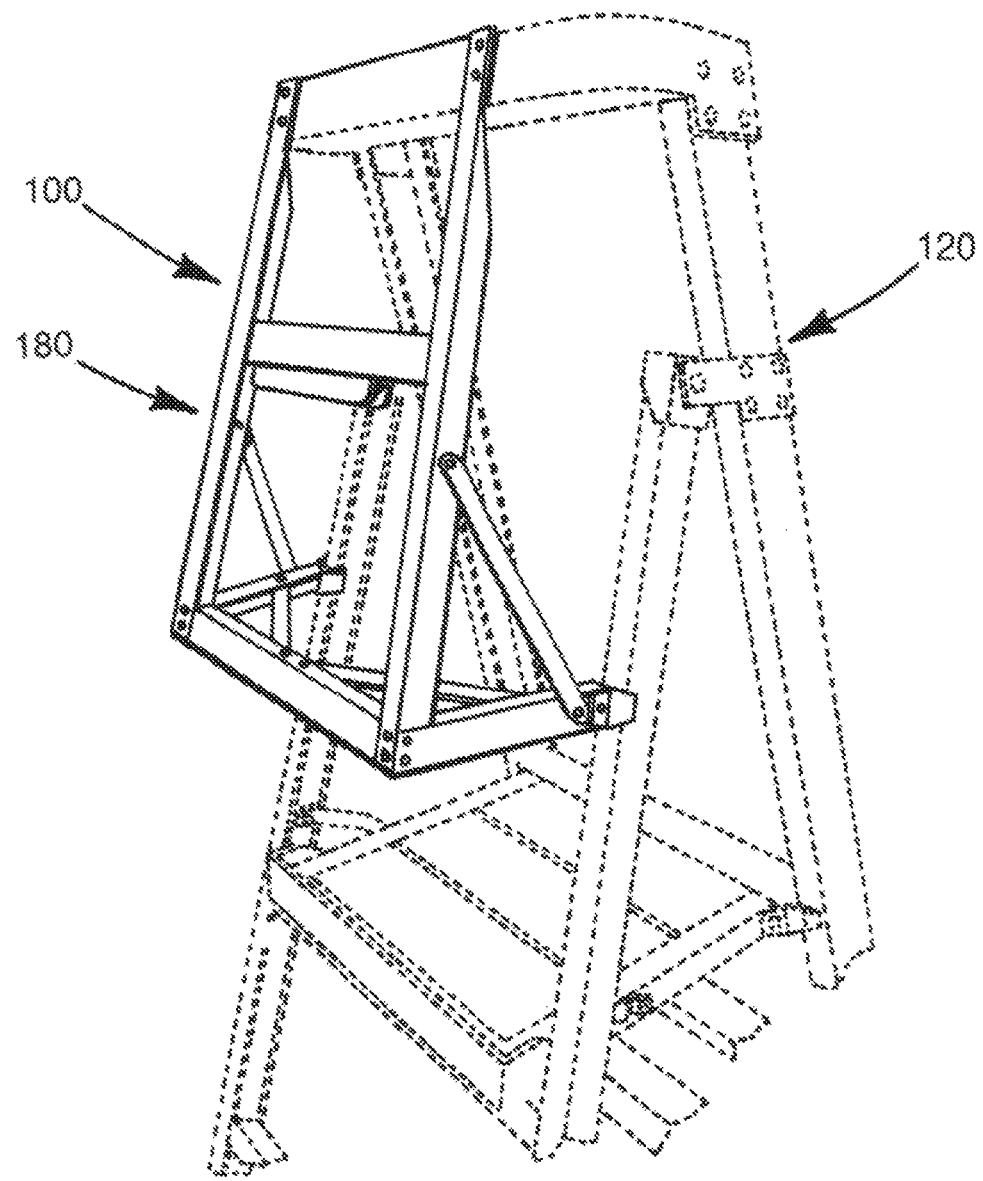
FIG. 9 depicts a side, perspective view of podium ladder adapter 100 of this invention attached to podium ladder 120.
Figure 10:
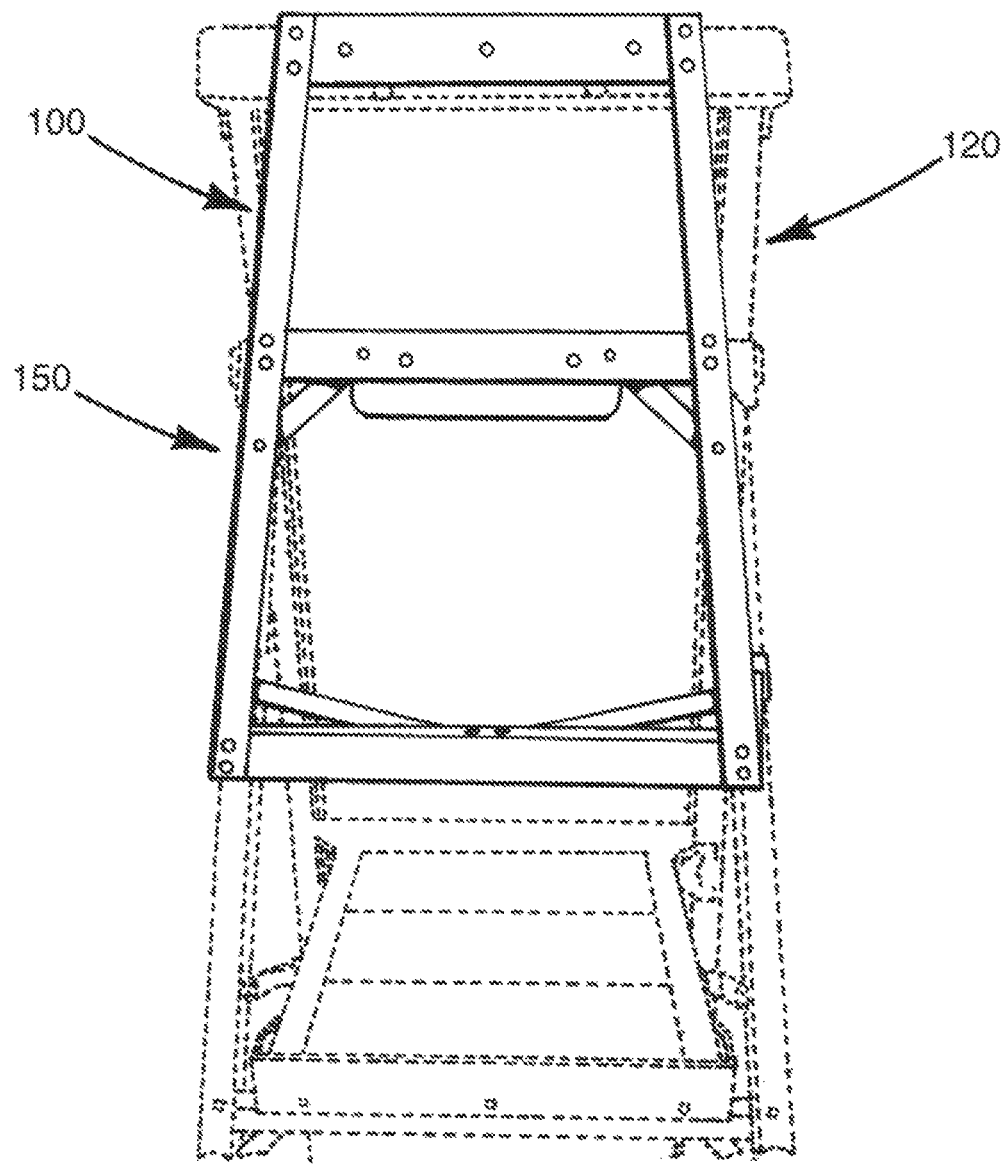
FIG. 10 depicts a rear, perspective view of podium ladder adapter 100 of this invention attached to podium ladder 120.
Figure 11:
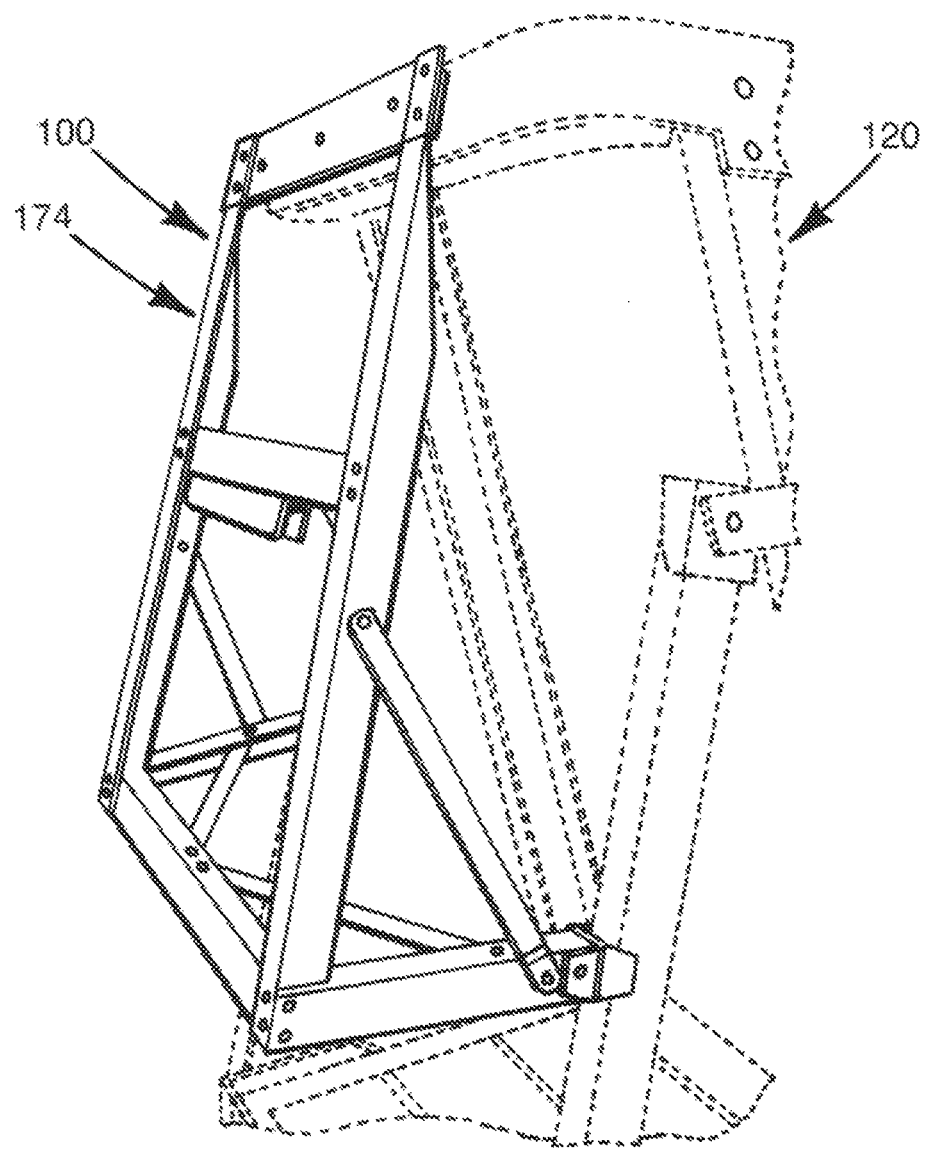
FIG. 11 depicts a profile, perspective view 174 of podium ladder adapter 100 of this invention attached to podium ladder 120.
Figure 12:
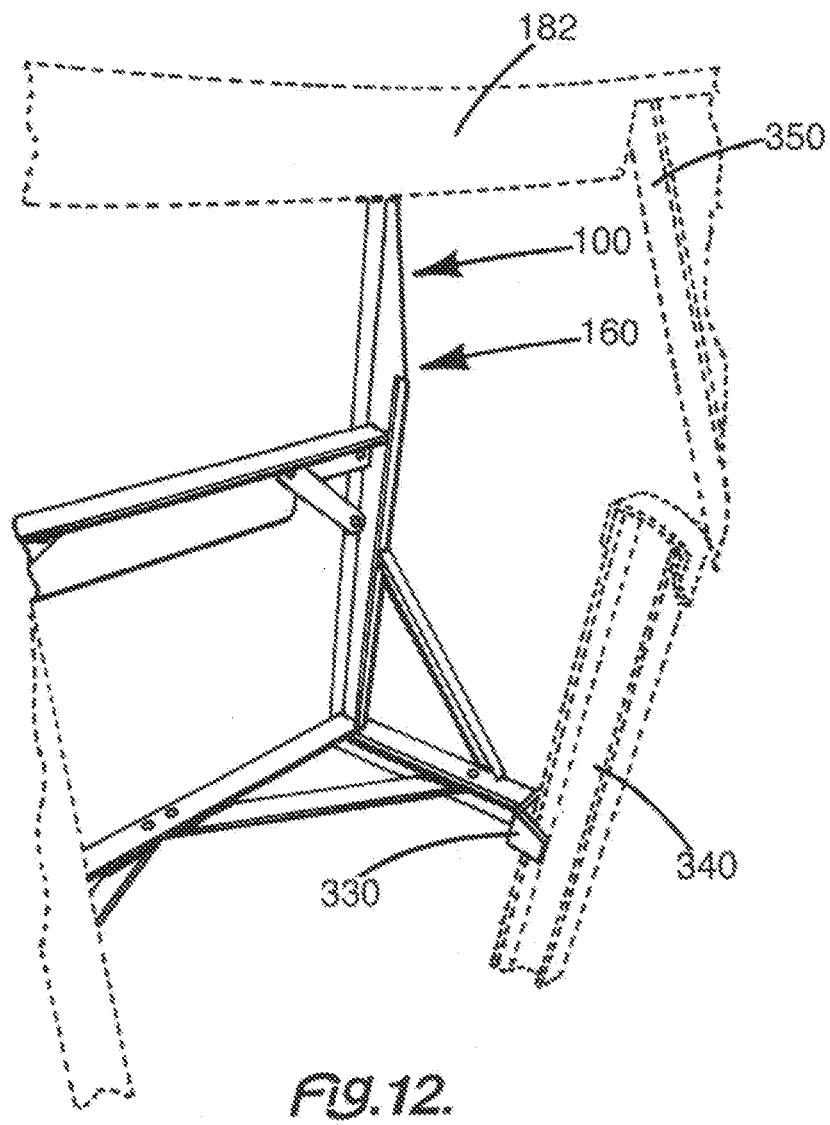
FIG. 12 depicts a front, perspective view of podium ladder adapter 100 of this invention attached to right rear, support rail 340 of podium ladder 120.

Adding FIG. 2, FIG. 3 and FIG. 4 to the consideration; rear perspective view 180 of the podium ladder adapter 100 clarifies the function thereto. As shown, the podium ladder adapter 100 has a right rear vertical brace 200 and a parallel and cooperating left rear vertical brace 202. Extending between and engaged to both of these braces 200 and 202 are a top cross member 210, a middle cross member 220 and a bottom or lower cross member 230. The middle cross member 220 is secured to braces 200 and 202 between top cross member 210 and bottom cross member 230.

Extending forwardly from right rear vertical brace 200 is a right base arm 240 and extending forwardly from left rear vertical brace 202 is a left base arm 250, the arms 240 and 250 being located adjacent to bottom cross member 230. Each of the arms 240 and 250 terminates in a rail grip 330 and 332, respectively, at a free forward end of each arm.

Right side strut 310 connects right rear rail grip 330 to right rear vertical brace 200. Left side strut 312 connects left rear rail grip 332 to left rear vertical brace 202. Side struts 310 and 312 are respectively provided between their cooperating vertical braces 200 and 202, and their respective arms 240 and 250 to secure an angular position between the structures at a perpendicular angle. Further, horizontal struts 320 and 322 extend from the bottom cross member 230 respectively to the respective arms 240 and 250 to provide further support for the arms.

Still further, inwardly upwardly oriented struts 300 and 302 extend respectively from vertical braces 200 and 202 to middle cross member 220 to further stabilize the adapter 100. Yet further, extending forwardly from the top cross member 210 at spaced apart locations are provided two vertical substantially cylindrical protrusions, namely for the right key 192 and for the left key 194 which are mounted to the top cross member 210 by means of a keyway assembly 190, the necessity of which will be described hereinafter. Finally a horizontal channel forming member 204 is seen to extend downwardly and slightly rearwardly of center cross member 220, the necessity of which will also be described in greater detail hereinafter.

With FIG. 4, the structure of keyway 190 is visible and shows same to incorporate two groups of intermittently spaced apart downwardly extending flanges 196 the necessity of which will be described hereinafter in detail.

Turning now to FIG. 5, FIG. 6, FIG. 7 and FIG. 8, podium ladder 120 has a tool or holster top section 182 which includes at a rear end thereof two spaced apart nearly completely cylindrical vertical slots 196 and 198 which respectively receive and engage therein keys 194 and 192 of the adapter 100. As the left key 192 and right key 194 slide downwardly into left receiving slot 196 and right receiving slot 198, the right rear rail grip 330 and left rear rail grip 332 respectively engage around right and left rear vertical support rails 340 and 342 of the ladder 120, stabilizing the podium ladder adapter 100 engagement to the ladder 120.

Figure 13:
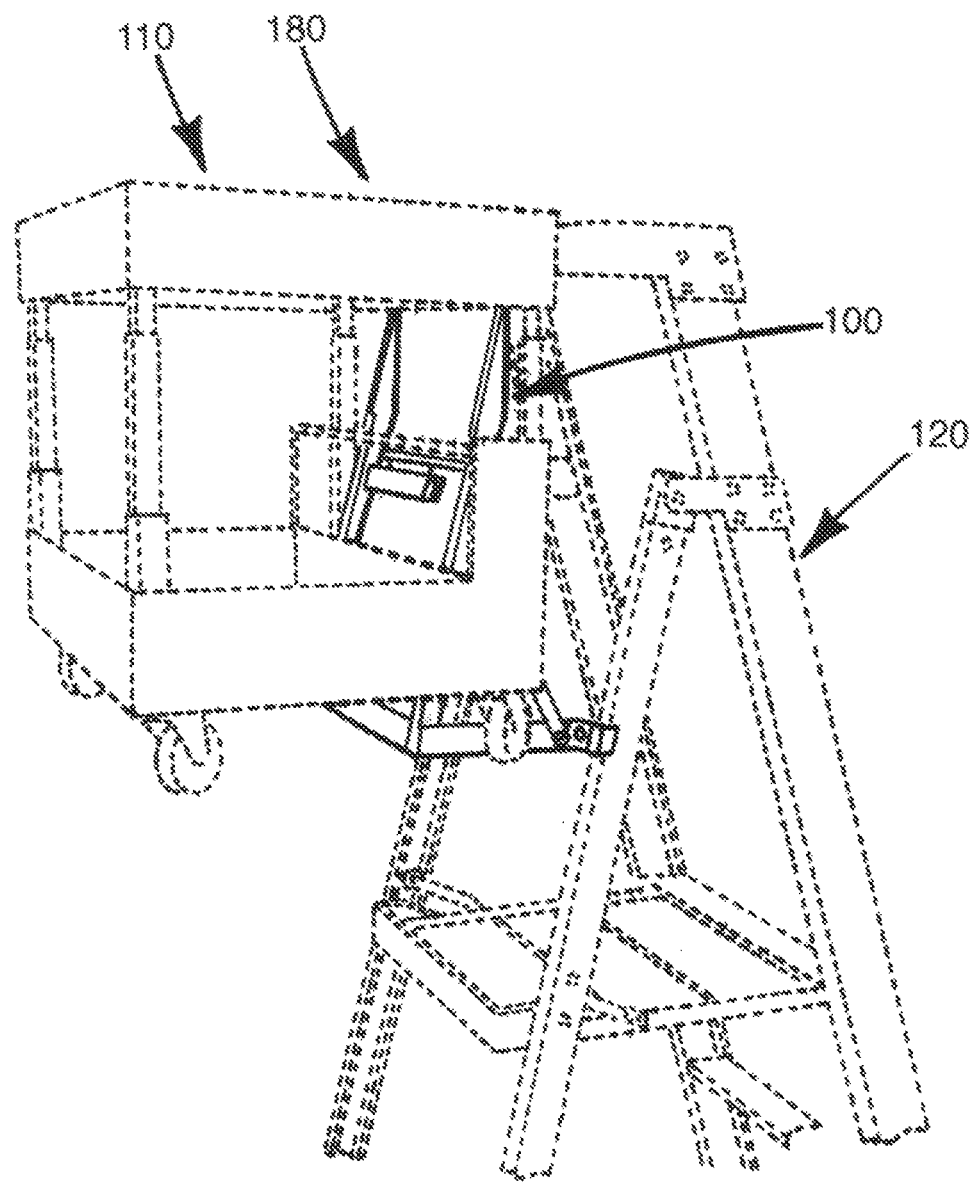
FIG. 13 depicts a rear, perspective view of podium ladder adapter 100 of this invention in use and attached to podium ladder 120.

In FIG. 9, FIG. 10, FIG. 11 and FIG. 12, the securing of podium ladder adapter 100 to the ladder 120 is complete. When tool cart 110 is engaged to the podium ladder adapter 100 (FIG. 13), it may act as a counterbalance for the worker (not shown) on the ladder 120.

Figure 14:
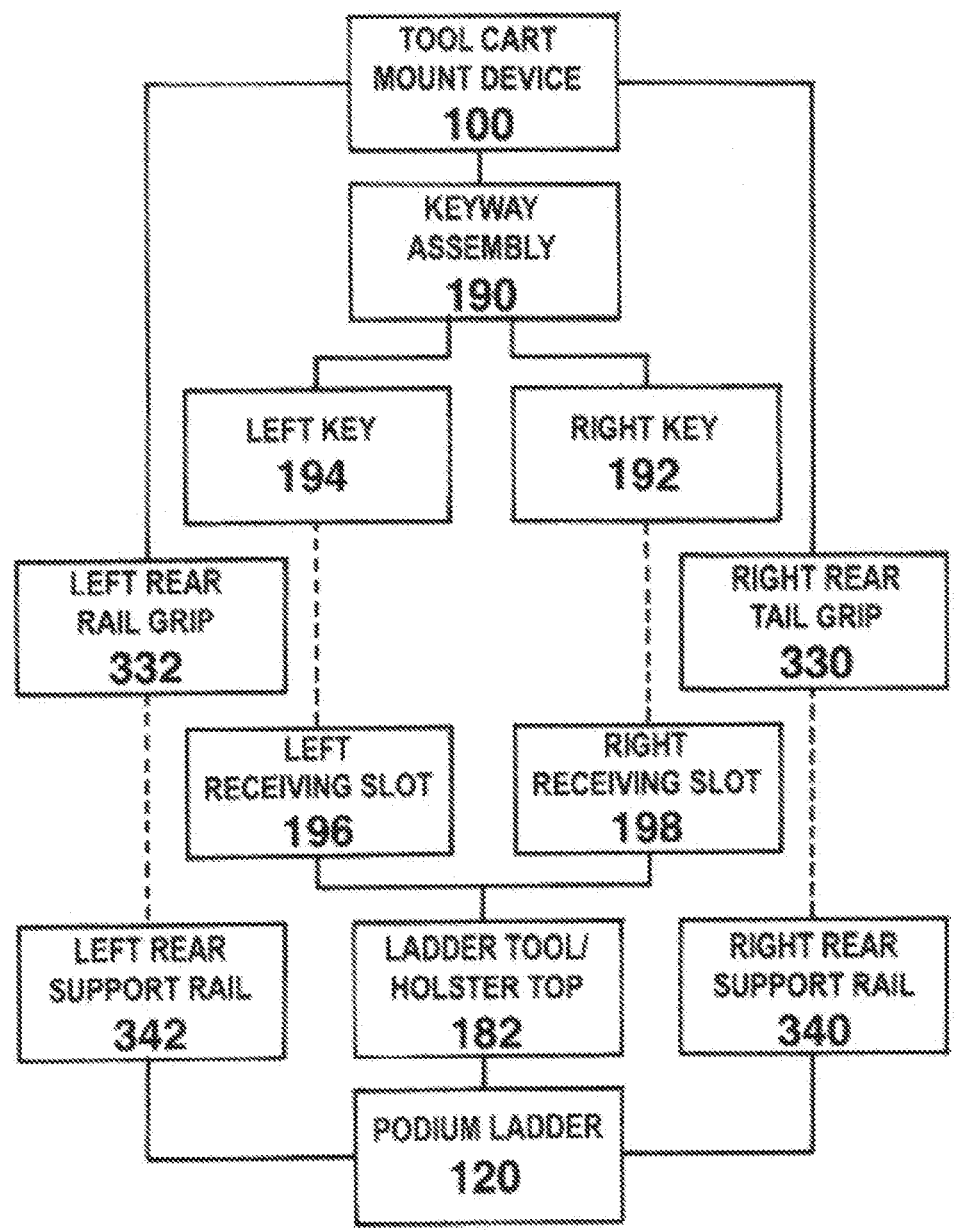
FIG. 14 depicts a box chart and flow diagram of podium ladder adapter 100 of this invention.

With FIG. 14, the podium ladder adapter 100 shows a variety of advantages offered to the construction trades. A keyway assembly 190 on podium ladder adapter 100 provides a right key 192 and a left key 194. Left key 194 communicates with left receiving slot 196. Right key 192 communicates with right receiving slot 198. Both left receiving slot 196 and right receiving slot 198 communicate with ladder tool or holster top 182, which in turn communicates with podium ladder 120.

Also in FIG. 14, right rear rail grip 330 and left rear rail grip 332 extend from podium ladder adapter 100. Left rear rail grip 332 extends into left rear support rail 342, while right rear rail grip 330 extends into right rear support rail 340. Both left rear support rail 342 and right rear support rail 340 extend into podium ladder 120.

Figure 15:
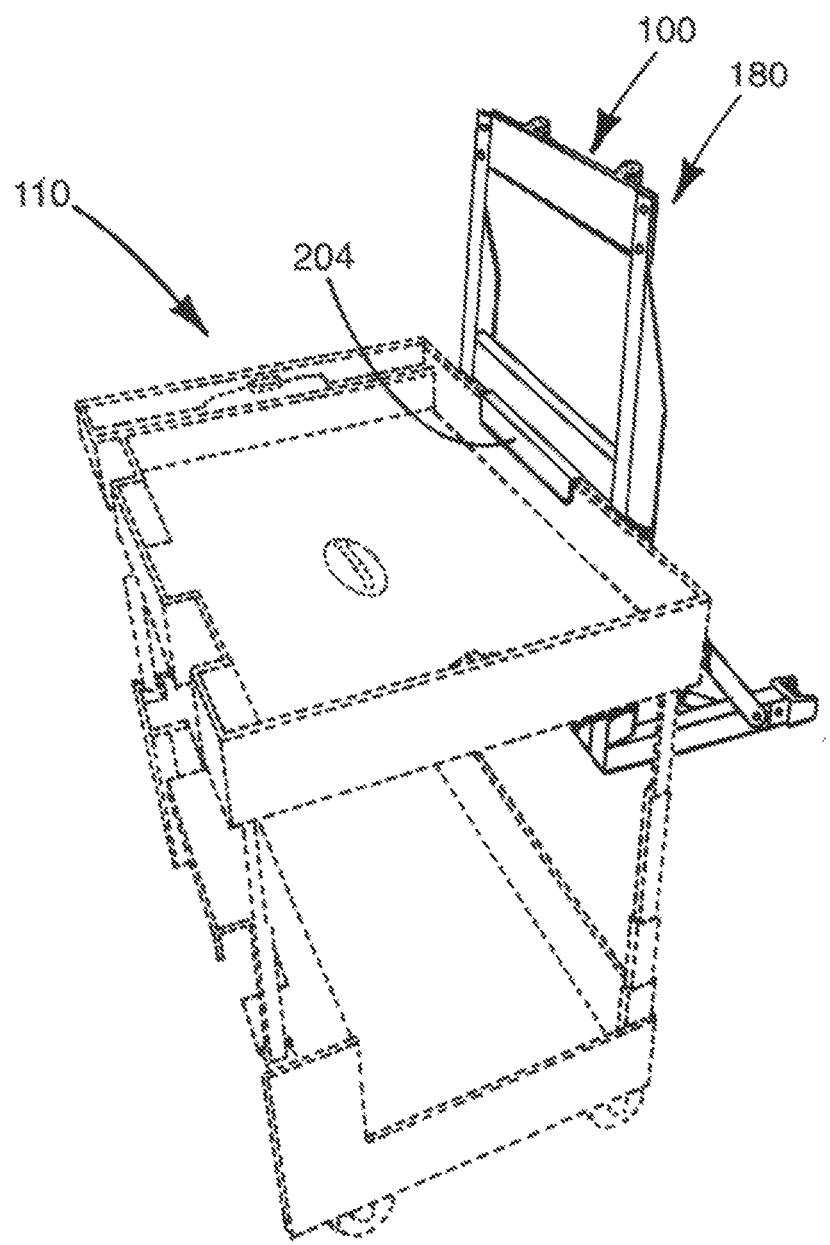
FIG. 15 depicts a rear, perspective view 180 of podium ladder adapter 100 of this invention held to tool cart 110 using tool cart channel 204.
Figure 16:
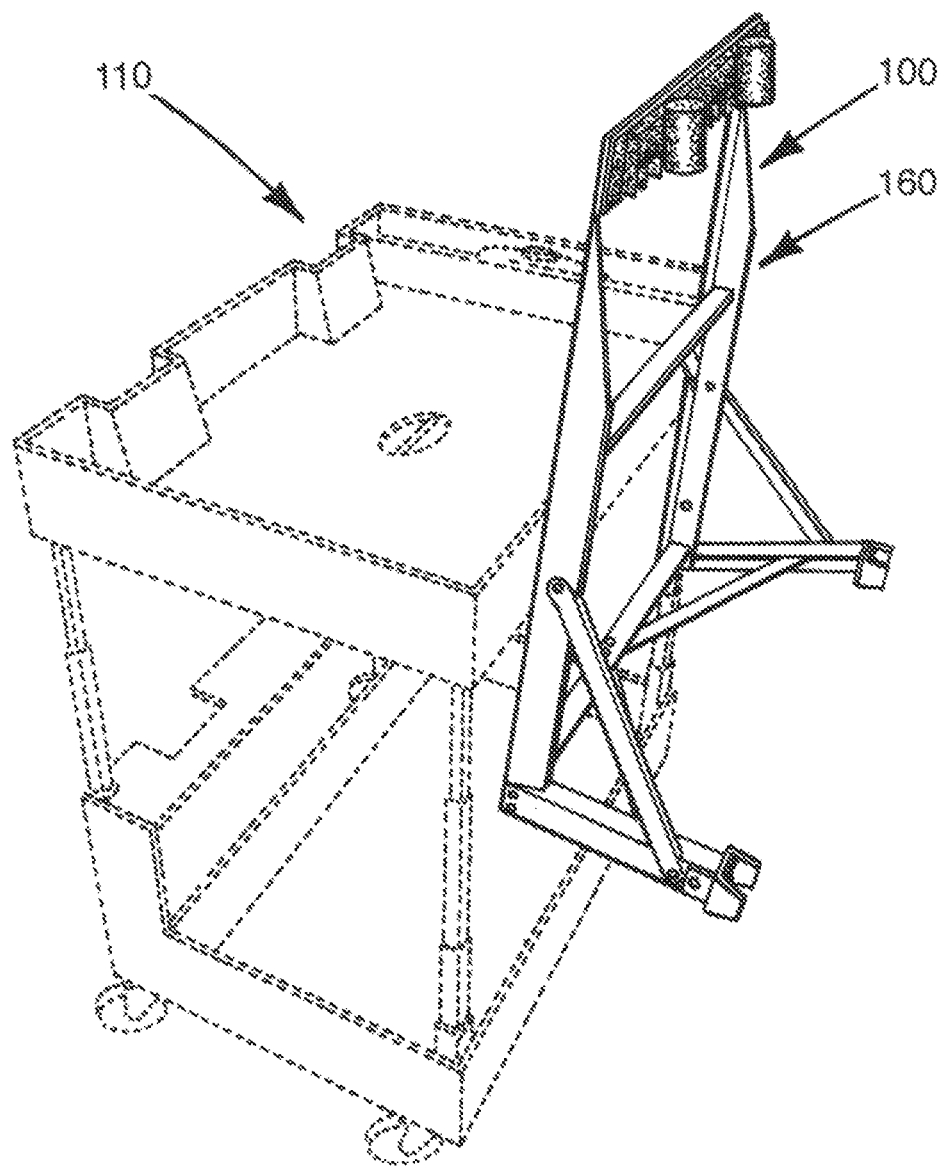
FIG. 16 depicts a front, perspective view 160 of podium ladder adapter 100 of this invention resting on tool cart 110.
Figure 17:
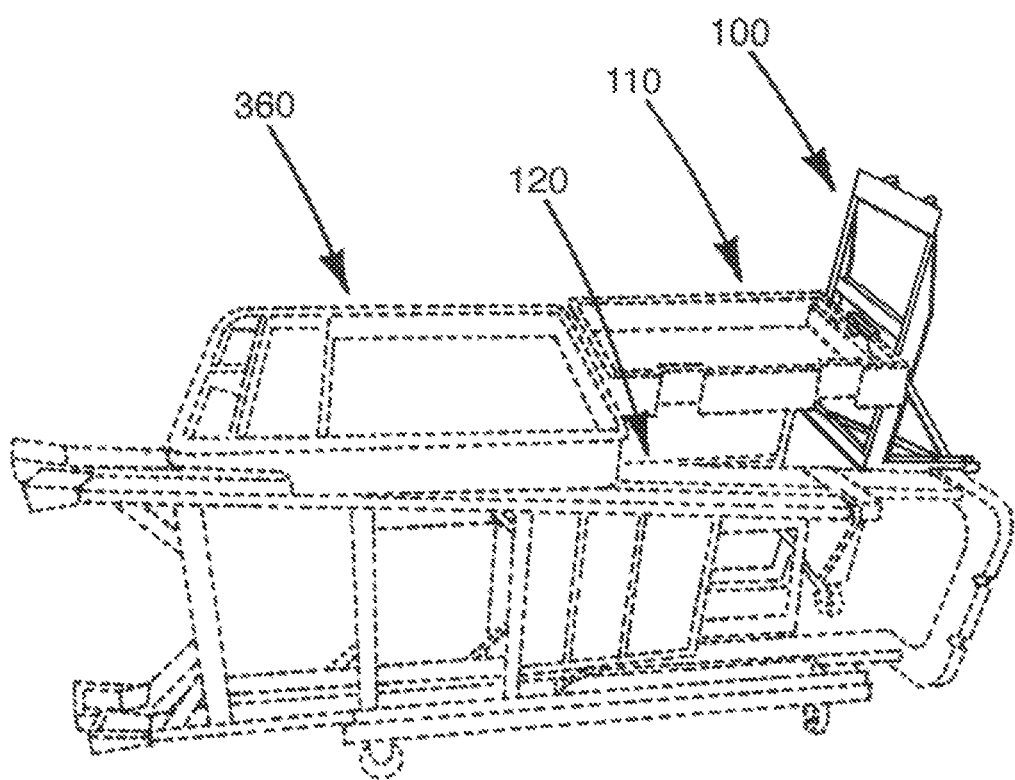
FIG. 17 depicts perspective view of podium ladder adapter 100 of this invention resting on tool cart 110 along with podium ladder 120, all being secured to transport cart 360, for moving all items to a work site.

Now considering FIG. 15, FIG. 16, and FIG. 17; podium ladder adapter 100 is used with tool cart 110 as shown from rear, perspective view 180 (FIG. 15) of podium ladder adapter 100 using tool cart channel 204. With FIG. 16; the front, perspective view 160 of podium ladder adapter 100 shows the same resting on tool cart 110. Tool cart 110 is more clearly described as Number 100 in U.S. Pat. No. 9,359,818; incorporated herein by reference, and filed by the same inventor.

Then with FIG. 17, podium ladder adapter 100 is shown as resting on tool cart 110 along with podium ladder 120 being secured to transport cart 360, for moving all necessary items to a work site. Transport cart 360 is more clearly described as Number 100 in U.S. Pat. No. 8,967,632; incorporated herein by reference, and filed by the same inventor.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A podium ladder adapter for supporting or transporting at least one tool or material to a desired position comprising:
   a right rear vertical brace and a left rear vertical brace connected to the podium ladder adapter;
   a top cross member, a middle cross member and a bottom cross member connected to the right rear vertical brace and the left rear vertical brace;

a right base arm extended forwardly from the right rear vertical brace;
a left base arm extended forwardly from the left rear vertical brace;
the right base arm and the left base arm located adjacent to the bottom cross member;
the right base arm terminated by a right rear rail grip;
the left base arm terminated by a left rear rail grip;
the right rear rail grip connected to the right rear vertical brace by a right side strut;
the left rear rail grip connected to the left rear vertical brace by a left side strut.

2. The podium ladder adapter of claim 1 further comprising:
a first horizontal strut extended from the bottom cross member to the right base arm;
a second horizontal strut extended from the bottom cross member to the left base arm;
a first side strut extended from the right rear vertical brace to the right base arm; and
a second side strut extended from the left rear vertical brace to the left base arm.

3. The podium ladder adapter of claim 2 further comprising:
the first side strut secured to the right rear vertical brace and secured perpendicularly to the right base arm;
the second side strut secured to the left rear vertical brace and secured perpendicularly to the left base arm;
the first horizontal strut and the second horizontal strut provided further support for the right base arm and the left base arm respectively;
the middle cross member positioned between the top cross member and the bottom cross member;
a first inwardly and upwardly oriented strut extended from the right rear vertical brace to the middle cross member; and
a second inwardly and upwardly oriented strut extended from the left rear vertical brace to the middle cross member.

4. The podium ladder adapter of claim 3 further comprising:
a keyway assembly being mounted on the top cross member;
the keyway assembly operated with a left key or a right key;
the left key spaced apart from the right key;
a horizontal channel forming member cooperated with a center cross member;
the left key fitted with a left receiving slot; and
the right key fitted with a right receiving slot.

5. In a podium ladder, an improvement comprising a podium ladder adapter to cooperate with the podium ladder in order to transport a cart to a desired position and releasably secure the cart to the podium ladder:
the podium ladder adapter with a right rear vertical brace and a left rear vertical brace;
the right rear vertical brace connected to the left rear vertical brace by a top cross member, a middle cross member and a bottom cross member;
a right base arm extended forwardly from the right rear vertical brace;
a left base arm extended forwardly from the left rear vertical brace;
the right base arm and the left base arm located adjacent to the bottom cross member;
the right base arm terminated by a right rear rail grip;
the left base arm terminated by a left rear rail grip; and
the right rear rail grip connected to the right rear vertical brace by a right side strut.

6. The podium ladder of claim 5 further comprising:
the left rear rail grip connected to the left rear vertical brace by a left side strut;
the cart releasably secured to the podium ladder by the podium ladder adapter;
a first horizontal strut extended from the bottom cross member to the right base arm;
a second horizontal strut extended from the bottom cross member to the left base arm;
a first side strut extended from the right rear vertical brace to the right base arm; and
a second side strut extended from the left rear vertical brace to the left base arm.

7. The podium ladder of claim 6 further comprising:
the first side strut secured to the right rear vertical brace and perpendicularly to the right base arm;
the second side strut secured to the left rear vertical brace and perpendicularly to the left base arm;
the right base arm supported by the first horizontal strut;
the left base arm supported by the second horizontal strut;
the middle cross member positioned between the top cross member and the bottom cross member;
a first inwardly and upwardly oriented strut extending from the right rear vertical brace to the middle cross member; and
a second inwardly and upwardly oriented strut extending from the left rear vertical brace to the middle cross member.

8. The podium ladder of claim 7 further comprising:
a keyway assembly mounted on the top cross member;
the keyway assembly included with a left key and a right key;
the left key spaced apart from the right key;
a horizontal channel forming member cooperated with a center cross member;
the left key in communication with a left receiving slot;
the right key in communication with a right receiving slot;
the right receiving slot and the left receiving slot in communication with a holster top; and
the holster top in communication with the podium ladder.

9. A combination of a ladder and a ladder adapter comprising:
the ladder adapter having a right rear rail grip and a left rear rail grip extended therefrom;
a left rear support rail and a right rear support rail mounted on the ladder;
the right rear rail grip connected to the right rear support rail;
the left rear rail grip connected to the left rear support rail;
the ladder adapter supported by a right rear vertical brace and a left rear vertical brace;
the right rear vertical brace connected to the left rear vertical brace by a top cross member, a middle cross member and a bottom cross member;
a right base arm extended forwardly from the right rear vertical brace;
a left base arm extended forwardly from the left rear vertical brace;
the right base arm and the left base arm located adjacent to the bottom cross member;
the right base arm terminated by a right rail grip; and
the left base arm terminated by a left rail grip.

10. The combination of claim 9 further comprising:
the ladder is a podium ladder;
the adapter is a podium ladder adapter;

a right side strut connects the right rear rail grip to the right rear vertical brace;
a keyway assembly mounted on the top cross member;
a left side strut connects the left rear rail grip to the left rear vertical brace;
the left rear rail grip extends into the left rear support rail;
the right rear rail grip extends into the right left rear support rail;
the left rear support rail and the right rear support rail extends into the ladder; and
the keyway assembly incorporates two groups of intermittently spaced apart downwardly extending flanges.

11. The combination of claim 10 further comprising:
the podium ladder has a holster top section;
the holster top section includes at a rear end thereof two spaced apart nearly completely cylindrical vertical slots;
the nearly completely cylindrical vertical slots respectively receive and engage therein a left key and a right key of the podium ladder adapter;
the left key and the right key slide downwardly into a left receiving slot and a right receiving slot thereby causing the right rear rail grip and left rear rail grip to respectively engage around a right rear vertical support rail and a left rear vertical support rail of the podium ladder; and
the podium ladder adapter having a stabilized engagement with the podium ladder.

12. The combination of claim 11 further comprising:
the podium ladder adapter supports a tool cart on the podium ladder,
the tool cart provides access to tools or materials;
the tool cart engages the podium ladder adapter and acts as a counterbalance for use of the podium ladder; and
the podium ladder adapter has a tool cart channel to facilitate supporting of the tool cart on the podium ladder.

13. The combination of claim 12 further comprising:
a first horizontal strut extending from the bottom cross member to the right base arm;
a second horizontal strut extends from the bottom cross member to the left base arm;
a first side strut extends from the right rear vertical brace to the right base arm; and
a second side strut extends from the left rear vertical brace to the left base arm.

14. The combination of claim 13 further comprising:
the first side strut secures the right rear vertical brace perpendicular to the right base arm;
the second side strut secures the left rear vertical brace perpendicular to the left base arm;
the first horizontal strut and the second horizontal strut further support the right base arm and the left base arm respectively;
the top cross member has the middle cross member positioned between the top cross member and the bottom cross member;
a first inwardly and upwardly oriented strut extends from the right rear vertical brace to the middle cross member; and
a second inwardly and upwardly oriented strut extends from the left rear vertical brace to the middle cross member.

15. The combination of claim 14 further comprising:
a keyway assembly being mounted on the top cross member;
the keyway assembly including a left key and a right key;
the left key and the right key being spaced apart;
a horizontal channel forming member cooperated with a center cross member;
the left key communicated with a left receiving slot; and
the right key communicated with a right receiving slot.

* * * * *